United States Patent
Gilman et al.

(10) Patent No.: US 12,462,829 B1
(45) Date of Patent: Nov. 4, 2025

(54) AUDIO RESAMPLING FOR MEDIA SYNCHRONIZATION

(71) Applicant: Amazon Technologies, Inc., Reno, NV (US)

(72) Inventors: Jordan Gilman, Portland, OR (US); Trevor Wells, Washougal, WA (US); Max C. Denton, Portland, OR (US)

(73) Assignee: Amazon Technologies, Inc., Reno, NV (US)

( * ) Notice: Subject to any disclaimer, the term of this patent is extended or adjusted under 35 U.S.C. 154(b) by 309 days.

(21) Appl. No.: 17/854,478

(22) Filed: Jun. 30, 2022

Related U.S. Application Data

(60) Provisional application No. 63/344,916, filed on May 23, 2022.

(51) Int. Cl.
| | |
|---|---|
| *G10L 21/04* | (2013.01) |
| *G10L 19/00* | (2013.01) |
| *H04N 21/233* | (2011.01) |
| *H04N 21/2343* | (2011.01) |
| *H04N 21/43* | (2011.01) |

(52) U.S. Cl.
CPC ............ *G10L 21/04* (2013.01); *G10L 19/00* (2013.01); *H04N 21/2335* (2013.01); *H04N 21/234336* (2013.01); *G10H 2210/385* (2013.01); *H04N 21/43072* (2020.08)

(58) Field of Classification Search
CPC ............ G10L 21/04; G10H 2210/385; H04N 21/43072
See application file for complete search history.

(56) References Cited

U.S. PATENT DOCUMENTS

| | | | | |
|---|---|---|---|---|
| 2005/0281255 | A1* | 12/2005 | Davies | H04N 21/4396 375/E7.278 |
| 2006/0230169 | A1* | 10/2006 | Kaplan | H04N 21/6131 709/231 |
| 2011/0202637 | A1* | 8/2011 | Delahaye | H04L 65/613 709/219 |
| 2012/0180619 | A1* | 7/2012 | Adam | G10H 1/0066 84/612 |
| 2013/0301831 | A1* | 11/2013 | Sato | H04N 21/41407 380/236 |

(Continued)

OTHER PUBLICATIONS

Maung, et al. "Authentication of MP4 File By Perceptual Hash and Data Hiding," Malaysian Journal of Computer Science, vol. 32(4), 2019. (Year: 2019).*

(Continued)

*Primary Examiner* — Feng-Tzer Tzeng
(74) *Attorney, Agent, or Firm* — Hogan Lovells US LLP

(57) ABSTRACT

Approaches provided herein can provide for adjustments to audio data. In particular, an audio resampling process can be performed wherein the correct audio frame size is determined. A "target" audio stream duration, as may be indicated by a time-to-sample atom (STTS) atom, can be used to apply one or more pitch-invariant, time-stretching audio filters to the audio data as that data is decoded during a media transcode process. A resulting output media metadata can specify accurate, constant audio frame durations, and the audio stream duration can match the corresponding video stream duration in a media file.

20 Claims, 10 Drawing Sheets

(56) References Cited

U.S. PATENT DOCUMENTS

2014/0056569 A1* 2/2014 Moss ................. H04N 21/4341
348/515
2021/0185415 A1* 6/2021 Moreno .................. G06F 16/61

OTHER PUBLICATIONS

Damnjanovic, et al. "A Real-Time Framework for Video Time and Pitch Scale Modification," IEEE Transactions on Multimedia, Jun. 2010. (Year: 2010).*

Damnjanovic, et al., "A Real-Time Framework for Video Time and Pitch Scale Modification," IEEE Transactions on Multimedia, Jun. 2010 (see attached reference in the previous Office action). (Year: 2010).*

* cited by examiner

AUDIO RESAMPLING FOR MEDIA SYNCHRONIZATION

CROSS-REFERENCE TO RELATED APPLICATIONS

This application claims priority to U.S. Provisional Patent Application Ser. No. 63/344,916, filed May 23, 2022, and entitled "Elastic Audio Resampling," which is hereby incorporated herein in its entirety and for all purposes.

BACKGROUND

In processing multimedia content, there may be instances where the content contains audio that does not provide for correct presentation of the media file. In such content, the audio stream duration may not match the video stream duration, which can result in the audio not matching up or being properly synchronized with the video during presentation. In some prior approaches, container metadata such as a time-to-sample (STTS) atom can indicate audio frame timing information that can be used to force the audio track duration to match the video track duration. One problem with forcing such a match between an audio duration and a video duration is that such an approach does not actually modify the audio stream, which can result in downstream media players and file readers having to attempt to reconcile the audio stream with the timing metadata in order to maintain audio synchronization with the video stream. Another issue with such an approach is that different media players may handle such a discrepancy in different ways, which can lead to inconsistent viewer experiences with respect to the media. For example, certain media players will perform "hard compensation" by dropping audio frames (which involves discarding at least some of the original or input audio), or inserting silent frames in various locations or at various times, in order to maintain audio-video synchronization, but such an approach often produces easily audible artifacts in the audio track. Other media players leverage the starting location for media playback, re-aligning the audio whenever the user scrubs to different sections of the media, but such an approach can result in the media becoming highly distorted if permitted to play out over a period of time.

BRIEF DESCRIPTION OF THE DRAWINGS

Various embodiments in accordance with the present disclosure will be described with reference to the drawings, in which.

DETAILED DESCRIPTION

Figure 1:
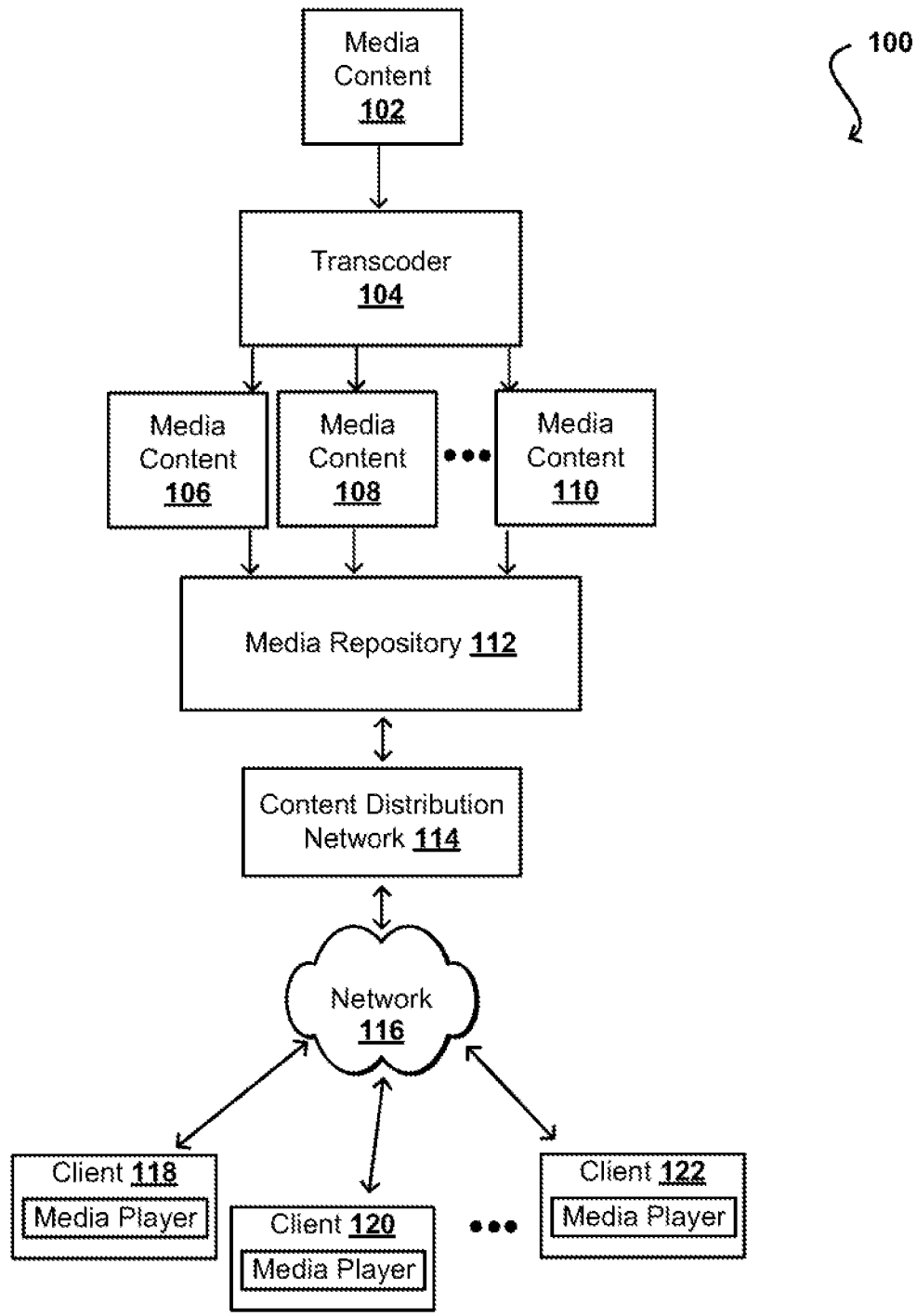
FIG. 1 illustrates an example content distribution system that can be utilized in accordance with various embodiments.

Approaches described and suggested herein relate to the resampling of malformed, or otherwise inconsistent, media data or content. This can include performing resampling for individual frames of an audio track, such as to cause the audio track to be synchronized with a video track of a media file. In at least one embodiment, audio resampling can be performed to adjust at least some of the audio frames to correspond to a "correct" or target audio frame size. An audio sampling process may also use the target audio stream duration, as may be indicated by a time-to-sample STTS atom or similar data source, to apply one or more time-stretching audio filters to the audio data as the audio data is decoded during a media transcode process. This resampling can be performed, in at least some embodiments, without modifying the pitch of the audio data for a given frame. The resulting output media can then have associated metadata that will represent accurate and constant audio frame durations, with the audio stream duration matching (e.g., being the same as or within an allowable deviation of) an expected duration, such as may correspond to the video stream duration. Various other such functions can be used as well within the scope of the various embodiments as would be apparent to one of ordinary skill in the art in light of the teachings and suggestions contained herein.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Various approaches presented herein can provide data or content to multiple recipients in a network-inclusive environment. This can include, for example, providing media content (e.g., audio, video, multimedia, virtual reality (VR), or augmented reality (AR) content) to be presented via one or more client devices (or other such recipients) as illustrated in the example system 100 of FIG. 1. Various other types of data or content can be provided using such a system as well within the scope of various embodiments presented herein. In this example, there is an instance of media content 102 that may include audio and video content that are to be displayed together synchronously, such as may be part of a movie or multimedia file. As known for such types of content, there may be a need to encode this content for transmission and/or playback, such as to provide for compression of the data using a codec that corresponds to a format supported by at least one client device 118 of a set of client devices 118, 120, 122 that have requested, or may request, to receive a copy of the media content 102. In this example, a content provider might use at least transcoder 104 to provide differently-encoded versions or instances of the media content 106, 108, 110. In this example, these instances can be stored to a media repository 112 or other such storage location for subsequent access or retrieval. In some systems, there may be multiple such repositories, as may be located (geographically or logically) at a network edge in order to reduce a latency of transmission to a client device in a specific location.

In such a system, various client devices 118, 120, 122 can send requests for the content across at least one network 116. The client devices can be any devices or components (physical and/or virtual in hardware and/or software) able to request, receive, and/or present the media content using a presentation device, such as via an attached, embedded, or connected monitor, touchscreen, speaker, wearable display, or media projector. The network 116 can correspond to one or more wired and/or wireless networks of similar or different types, as may include the Internet, a cellular network, a local area network (LAN), a peer network, or other such networks. The requests can be received to a content distribution network (CDN) 114 in this example, but can alternatively be received to any appropriate address or interface of a content provider system or environment. In this example, the CDN 114 includes hardware and software for determining the appropriate instance of media content in the media repository 112 and providing that instance to the requesting client device (or other appropriate destination) in response to the request. In some embodiments, the CDN 114 may first have to determine that the requestor is authorized to obtain or access that instance of media content. The CDN can include one or more servers for transmitting the content, such as by streaming or download, as well as components such as load balancers, routers, network switches, and application programming interfaces (APIs) for supporting such content transmission. In this example, the instances provided to these client devices 118, 120, 122 can include instances with formats that are supported by media players (or other media presentation or consumption applications) executing on those client devices.

As mentioned, however, there may be instances where the media content to be provided to these client devices is malformed, or at least partially inconsistent. For example, the original input media content 102 might include both audio and video portions, which can be transmitted as audio and video streams, but the duration of the audio stream is not the same as, or within an acceptable amount of deviation of, an expected duration (e.g., the duration of the video stream). In other instances, the durations might be similar, but there might be variation in the length of individual portions or time steps, such that at different points during playback the audio may get "ahead of" or "behind" the video, or where the audio, video, captions, augmented content, or other content will otherwise not be sufficiently synchronized, such that the audio will not accurately correspond to the video during playback.

In some instances, the media players on various client devices can utilize information, such as a time-to-sample atom (STTS) that indicates audio frame timing, to force the duration of the audio track to match the expected duration, entirely and/or in respective portions. A potential problem with forcing an audio duration match via container metadata is that such an approach does not actually modify the audio stream, as mentioned previously, such that downstream media players and file readers are left to reconcile the audio stream with the timing metadata in order to maintain audio synchronization with the video stream. Furthermore, there can be significant differences in reconciliation of these differences as different media players handle these discrepancy in different ways as mentioned previously.

Accordingly, approaches in accordance with various embodiments can overcome these and other such deficiencies with prior approaches, at least in part, through media resampling. In at least one embodiment, audio resampling can be performed to determine the correct audio frame size for a media file, object, or stream. An audio sampling process can also use the "target" audio stream duration, as may be indicated by an STTS atom or similar data source, to apply one or more time-stretching audio filters to the audio data as the audio data is decoded during a media transcode process, as may be performed by a transcoder 104 such as that illustrated in FIG. 1. The resulting output media can have associated metadata that will then represent accurate and constant audio frame durations, with the audio stream duration matching (e.g., being the same as or within an allowable deviation of) the expected duration.

In one example, an STTS atom can either indicate a constant, per-frame discrepancy throughout the duration of an audio track, or may indicate shorter, localized periods of malformation. A heuristic can be used to determine whether the discrepancy is "constant," in that it deviates by, at most, an allowable amount of deviation. In one example, it was determined that a maximum audio-video drift of around 22 milliseconds ahead or behind a synchronization point was permitted, with 45 milliseconds being roughly the threshold of perceptible audio-video mismatch. Such a heuristic can utilize this maximum drift value, along with the audio sample rate, to determine a permissible threshold for audio frame drift. Such a process can iterate through the STTS atom while keeping a running total of samples read and samples estimated by the total average frame size at that particular point in time. If this value exceeds the +/−22 ms threshold, it may be determined that the malformed metadata track is not sufficiently constant to be stretched without pitch-shifting (or otherwise modifying) the audio, or without noticeable lag from viewers. If, on the other hand, the time-to-sample entries are determined to be sufficiently constant, then the entire track can be time-stretched by the same amount and a system can apply a filter, such as the pitch-invariant time-stretching FFMPEG filter: atempo, to effectively stretch the audio through resampling such that pitch or other aspects of the audio remains unchanged, or at least undetectably changed. Such a filter can apply an algorithm such as Waveform Similarity Overlap-Add (WSOLA), which may represent a best case scenario in at least one example as the output audio is not pitch-shifted. However, less uniform audio frame duration deviations may benefit from the use of a "soft compensation" resampling technique present in a filter, such as a resample FFMPEG filter. Such a filter can present a safer fix-up option at the cost of pitch-shifting the audio. With either filter, or a similar filter, the resulting audio track can match the accompanying video track without the need for hard compensation or other non-ideal techniques seen in available media players, such as VLC Player and QuickTime®.

A system in accordance with at least one embodiment can provide for improved handling of audio inputs provided to a media conversion system or service through a process such as dynamic audio resampling. Audio resampling can be considered to be dynamic when, for example, the audio is analyzed to determine the appropriate resampling to be performed for that audio, and where it may be determined during this analysis that different amounts or types of resampling are to be performed for individual frames or segments of the audio, where these determinations may be made offline or online, such as may occur in near-real time for an audio or media stream. Such an approach can specifically target a case in which the amount of audio bundled into a media container does not match the timing metadata of that audio within the container, for example, which can cause the system or service to transcode the media into output(s) in which the audio and video content is not out of synchronization, beyond an allowable amount of deviation. Such an approach can enable a system or service to use one or more time-stretching techniques to provide a high quality, in-sync media output. In order to further improve the output media quality for viewers or consumers, such an approach can also generate or provide a transcode output that matches specific playback expectations, such as those of a consumer or client device. An example implementation could provide a new setting within an audio selector settings group with dropdown options allowing a user to opt-in or opt-out of this dynamic resampling.

In at least some embodiments, input content is to be transcoded into one or more specific formats that include in-sync audio/video. The transcoding process should not add artifacts to the content, such as "popping" artifacts. (Soft) transcoded audio should also provide acceptable sound quality upon playback in many embodiments, allowing for some degree of subjectivity. Such an approach can leverage different setting options to offset subjective choices to a listener, if they desire, such as where a listener or consumer can choose one or more approaches with one or more tradeoffs to attempt to improve subjective audio quality. Such a system may also have certain constraints, as may be limited in one embodiment to MP4 (or similar container format) inputs containing an audio stream, where MP4 audio timing metadata will indicate a full-length track or an otherwise valid length to which to stretch or shrink the audio content.

In at least some embodiments, media inputs such as MP4 inputs are received to a transcoder, along with metadata that can indicate use of variable frame sizes. In certain instances, this might result in the metadata indicating that individual frames might contain 1,100 samples, whereas a codec specification such as AAC might require that the frame size only contain 1,024 samples. As a result, the metadata is indicating a length for each audio frame that is not permitted under the relevant specification. One prior approach to such discrepancy was to wait until the discrepancy is at least one frame long, such as where the discrepancy differs by at least 1,024 samples with the audio behind the video, and then insert a frame of silence to reduce the discrepancy back towards zero, keeping the audio substantially in synchronization with the video or other media content. In such an approach, the audio will be maintained within about one frame of synchronization. If, on the other hand, the audio gets ahead of the video by a frame of samples, then the system can instead drop a frame of original or received audio in order to keep the audio within about one frame of synchronization. As mentioned in more detail elsewhere herein, however, the addition or removal of frames of audio can produce audio artifacts during playback that are noticeable to a listener, which can negatively impact the user experience, and then indirectly impact content producers if the listener does not consume the rest of the content, or other available content, as a result of the artifacts. In some embodiments, systems can attempt to minimize the presence of these artifacts by resetting the audio at any opportunity, such as when a user moves or scrubs to a different point in the media file, or when an advertisement is played, among other such options.

Differences in sample sizes between frames of audio, video and/or other media content can occur for a number of different reasons. For example, a recorder software application might become bound to a particular processor, such as a central processing unit (CPU), whereby a number of samples in a given frame may depend at least in part upon the operational state of that CPU, wherein fewer samples might be recorded in a given frame of time if the CPU is under a heavy load. Approaches presented herein can attempt to compensate for these and other such discrepancies, such that all media channels remain in sync (within an allowable synchronization deviation) during playback or presentation.

In at least one embodiment, a system can compensate for such discrepancies by analyzing the metadata track for a media file, such as a static media file or object 102. This metadata track may include data in a time-to-sample or STTS table or box. From this metadata, the system can determine the duration of each audio frame in the file. A determination can be made as to which frames differ from a target size or number of samples, such as where the number of samples differs from 1,024. Information about this discrepancy can then be signaled downstream, such as to a decoder for the media file. Analysis of the metadata track can occur at any appropriate location, such as during a demultiplexer (demux) stage of a media transcode process in a transcoder 104, as illustrated in FIG. 1. A decoder can then utilize an audio filter to resample the audio for one or more frames, which can have the effect of time stretching the frame in one direction or the other. In at least some embodiments, this resampling can result in a temporal adjustment, wherein the audio for the frame will effectively be recorded or stored at a slightly slower or slightly faster pace, depending on the direction of the discrepancy, without changing the pitch of the audio. As discussed herein, for an audio track that is of different length than a video track, such resampling can be caused to apply a constant amount of adjustment to each audio frame. This assumes that the discrepancies are similar for each frame, such that adjusting a playback speed by the same amount for each frame will produce substantially synchronous audio throughout playback of the media file. Such an approach may also be sufficient where the differences between discrepancies for individual audio frames is relatively small, such as with less than a threshold or permissible amount of deviation. In some embodiments, a calculation can be performed to determine a value, such as a mean absolute deviation, and then compare this deviation to a threshold to determine whether constant adjustment can be applied to all audio frames. In some embodiments, a first pass through the audio will be performed to determine an average frame length, then a second pass can be performed to determine deviations from this average. If it is determined that the deviations from the average are less than a detectable threshold, such as less than 22 ms in duration for a given frame, then a constant adjustment can be applied to all frames which, while more accurate for some frames than others, will not result in a discrepancy that is detectable by the average viewer.

It might be the case, however, that the amount and direction of discrepancy between frames of an audio track and another media track vary by more than a threshold or permissible amount of deviation. Thus, applying a constant adjustment to all audio frames may still result in at least some of the frames of audio being out of sync with corresponding frames of video. In such situations, the discrepancy can be aggregated or monitored over time to determine the discrepancy for any given frame, depending not only upon any sample size difference for that individual frame but also any residual discrepancy from the frames that came before. A resampling process can then be applied to individual audio frames that may utilize different values for individual frames, but that may end up with each frame having a number of samples required for a given standard or format, such as 1,024 samples. Such a resampling approach can result in a higher quality consumer experience for a media file than if the audio were simply stretched in time, which could impact the pitch of the audio, or had audio frames added or removed, which could introduce audio artifacts that would be noticeable during playback or presentation. It might be the case that such an audio filter may be inappropriate for at least certain portions of a media file, wherein another approach such as audio stretching may be utilized.

In some embodiments, it may be expected that timing information is available for an audio track, else the track may be considered to be malformed, or potentially unplayable. In some embodiments, an additional pass through the audio may be performed to attempt to obtain or infer timing information, and this timing information could then be used as input to one or more resampling approaches presented herein. This first path could include decoding the audio and validating the data that is expected. Such an approach may also be useful in protecting against inaccurate timing information in the metadata.

In some embodiments, audio resampling may be performed to improve a quality of an audio track independent of any other video or media track. For example, an audio track may be recorded that may suffer from CPU or other limitations, as discussed above, which may cause the sample rate to vary between frames. In order to provide for more consistent and realistic audio free of such effects, the audio track could be analyzed to determine an average (or other) frame sample size, or expected frame sample size, and then perform resampling to cause all frames to be of approximately (or exactly) this sample size. Such a process can help to smooth out the quality of a malformed audio track to be more consistent in quality upon playback.

Figure 2A:
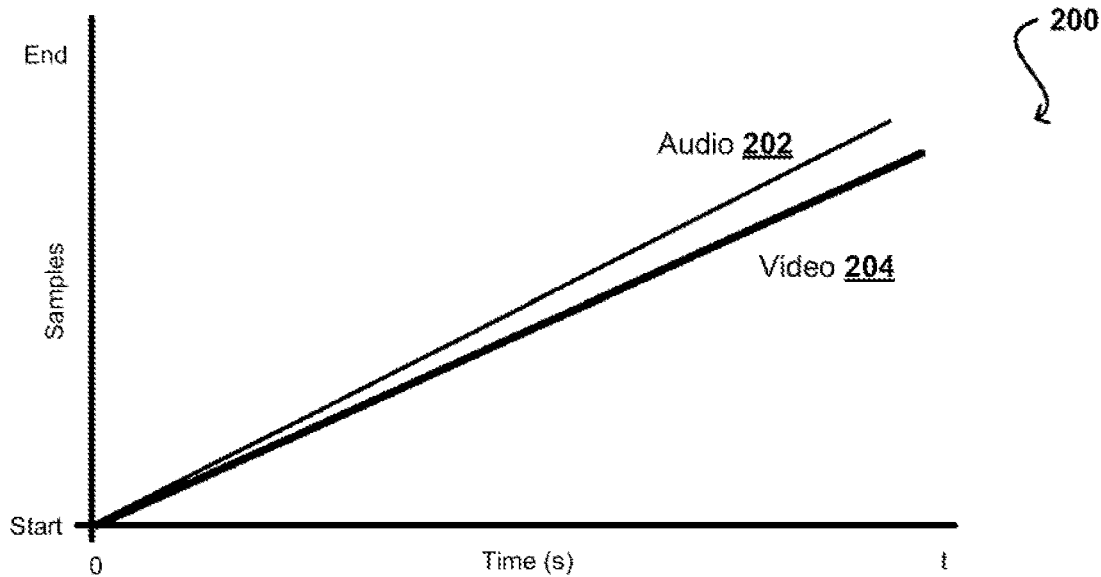
FIGS. 2A, 2B, and 2C illustrate example discrepancies in the number of samples in audio and video tracks, in accordance with various embodiments.
Figure 2B:
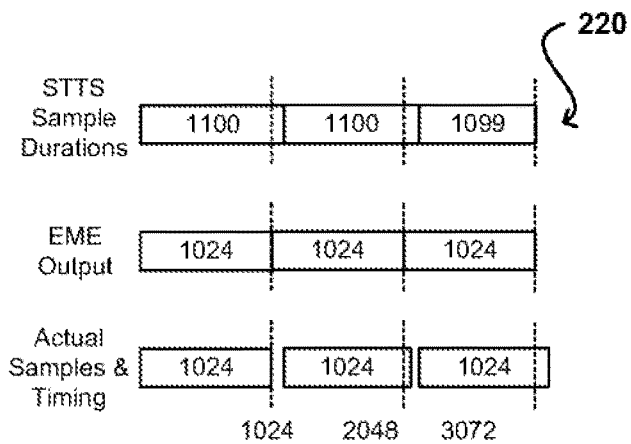
Figure 2C:
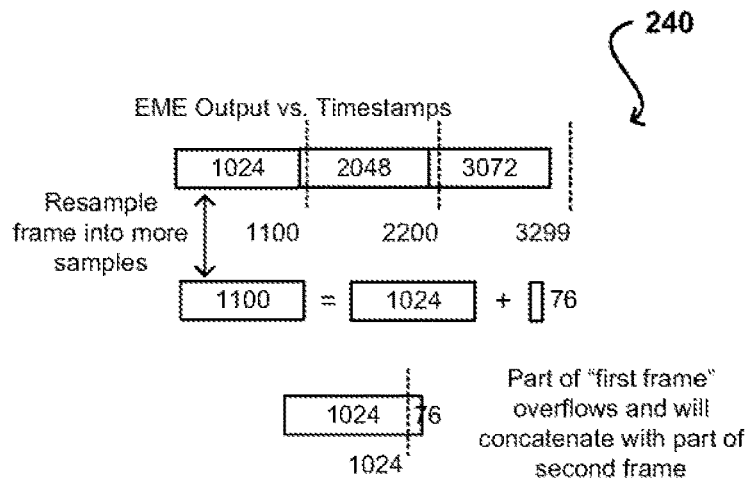

In at least one embodiment, media content can be provided by an entity, such as a customer of a content provider network. This entity-provided input media may contain variable framerate media, such as variable framerate Advance Video Coding (AVC) video and Advanced Audio Coding (AAC) audio. AAC audio can be organized in blocks or frames of 1024 time-domain samples, although in problematic input the metadata might suggest other durations resulting in mismatched audio and video, as illustrated in FIGS. 2A, 2B, and 2C. As illustrated in the plot 200 of FIG. 2A, different durations of audio 202 and video 204 data can result in an increasing amount of desynchronization over time. In this example, the rate of increase is relatively consistent, as the difference in the number of samples increases rather continually over time. In the example 220 of FIG. 2B, this could correspond to STTS durations of 1099 and 1100 samples. The total number of samples indicated in the container metadata, specifically the time-to-sample (STTS) atom, may correspond to a full length audio track, which may be intended to match a video length or duration. On reading through the audio in the stream, it can be determined that the real frames are true 1024-sample frames, and yet the number of frames is still equal to the number of frames in the metadata table, with this discrepancy being illustrated in FIG. 2B with respect to the actual samples and timing. When frames of this media are played back-to-back, the audio can appear to run fast and fall out of synchronization with the video. In the graph, the cumulative frame durations in the STTS atom, and as read from the decoder, illustrate that for any given timestamp on the y-axis, the audio is on an audio frame number greater than the corresponding metadata duration. The rate of change is constant in both cases, but because they are different rates they may drift over time.

When attempting to reconcile such a discrepancy, there may be at least two constraints to consider. A first constraint is that the audio frames correspond to 1024 samples, and that these audio frames are to concatenate exactly in this example, with no "in-between" frame space. In at least one embodiment, an audio synchronization block can remedy this issue with "hard" compensation. This can involve writing frames until the timestamps have surpassed the current point in time by at least one normally-sized audio frame duration, and then inserting a full audio frame of silence to bring back synchronization. In a reverse case, in which the audio may instead be too far along, an audio frame can be dropped instead. With hard compensation, it is possible to either add irrelevant audio data or lose relevant audio data, which may be audible in the resulting output audio in the form of, for example, clicks, pops, or skips. A better approach, in at least some instances, may be to utilize the existing audio data to compensate for the time discrepancy. This can be achieved through "soft" compensation. A soft compensation process may involve re-sizing each audio frame (or at least a subset of the audio frames) into a different number of samples, then distributing those samples across properly-sized frames to abide by system constraints. One such process is illustrated in the approach 240 of FIG. 2C. In this example, a frame is resampled into more samples. Part of the first frame samples overflow the frame size, and thus can concatenate with part of a second frame. Soft compensation processes can include sample rate conversion- and time domain transformation-based approaches. Sample rate conversion can affect the pitch of the audio, can be simple to apply in small intervals, and can produce pitch-shifting effects that are less pronounced in percussive audio content. For the time domain, a synchronized overlap-add (SOLA) approach can be used that is predominantly pitch-invariant, may require a larger window of audio data to apply, and may sound "phase-y" when there are many tones included, but may be extremely effective for relatively simple audio content, as may represent speech or percussion.

In at least one embodiment, a user or viewer can select from various settings used for audio resampling. These options may include, for example, auto, none, frame, or track options. For an automatic or "auto" option, a resampling system can automatically select from one of the other three (or more) options, depending at least in part upon whether the input audio is detected as problematic, and whether timestamp mismatches are determined to be sufficiently constant (e.g., within a threshold amount of deviation) across the duration of the file. For a "none" option, dynamic audio resampling can be disabled, such as for inputs with good audio metadata tracks or when the metadata is not a reliable description of the audio it describes. For a "frame" option, the system can "elasticize" at a frame level. In this mode, each frame can be modified to match the corresponding timestamp in the STTS atom. This type of repair can be fairly granular and can leave "good" frames alone. However, such an approach may simply use sample rate conversion to create more samples, and may be subject to pitch-shifting in the process. Stretching audio can also result in lower-pitched audio, while shrinking audio can result in higher-pitched audio. In one embodiment, a specific filter, such as an FFMPEG resample filter, may be used in this mode. For a "track" option, there may be a holistic "elasticization" that only takes into account the final mismatch between the STTS metadata and the expected size of each frame, whereby individual frames can be resized by an equal amount. Such a mode may be unsuitable for cases where only a short portion of the audio has issues, but may work very well for tracks with constant drift, as the output audio can be substantially pitch-invariant. This can be achieved through time domain transformations and in implementation, such as may be done using an FFMPEG atempo filter.

Figure 3A:
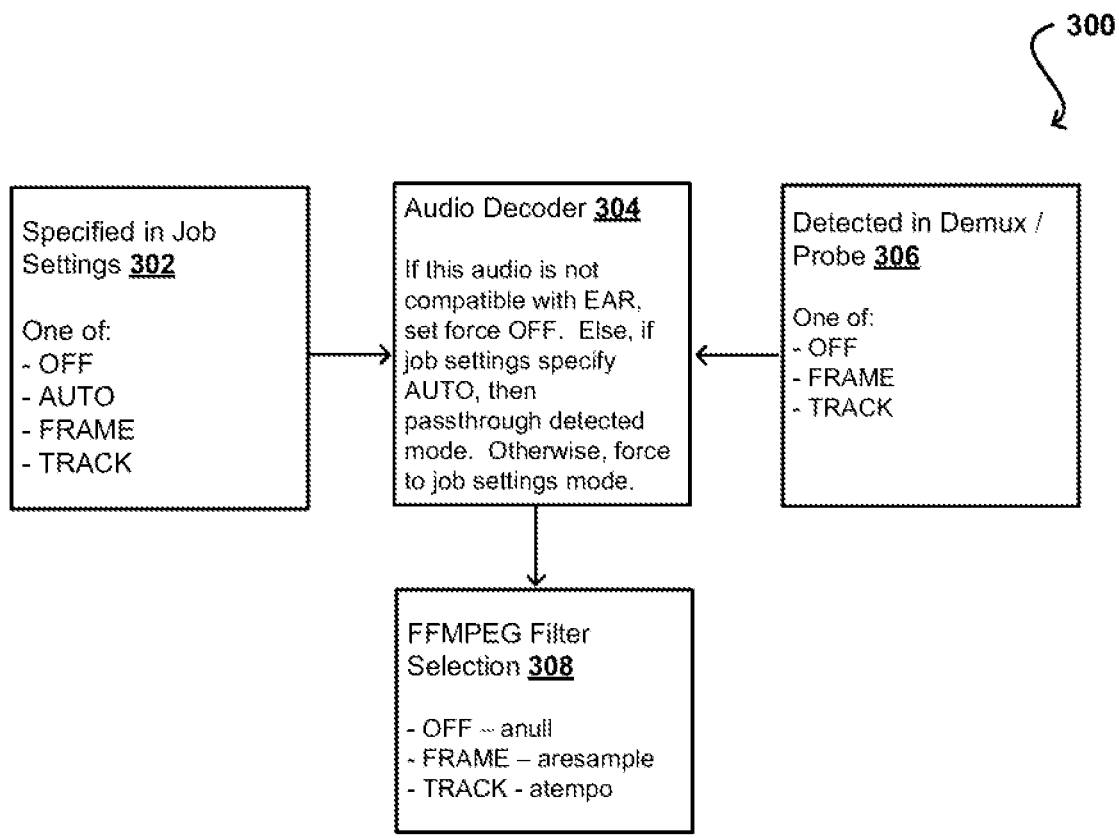
FIGS. 3A and 3B illustrate an example process performing audio resampling, as well as varying desynchronization that may benefit from such resampling, in accordance with various embodiments.

In at least one embodiment, a system can make a suggestion based, at least in part, upon a heuristic that analyzes the consistency of the frame durations, then reconciles that suggestion with the job setting specified by the user or viewer. An example flow 300 for such an approach is illustrated in FIG. 3A. In this example, an option or operational mode can be specified in one or more settings for a transcode job 302, which may include options such as Off, Auto, Frame, and Track, among other such options. In a given phase, such as a demux or probe phase, a "consistency" of the audio track metadata can be determined, which can be a function of how closely the track follows the average frame duration throughout the entirety of the duration of the track. A track needs to be consistent in order to filter the track through atempo, in at least some embodiments, as the filter will stretch every actual audio frame by the same factor, such as to be stretched to the average frame duration in the STTS box. If the track is not consistent, there may be periods of AV de-sync in the resulting media. Various STTS patterns may all result in the same average frame duration, where the "average" referenced may be calculated as an average of all frames, not a moving or running average.

Figure 3B:
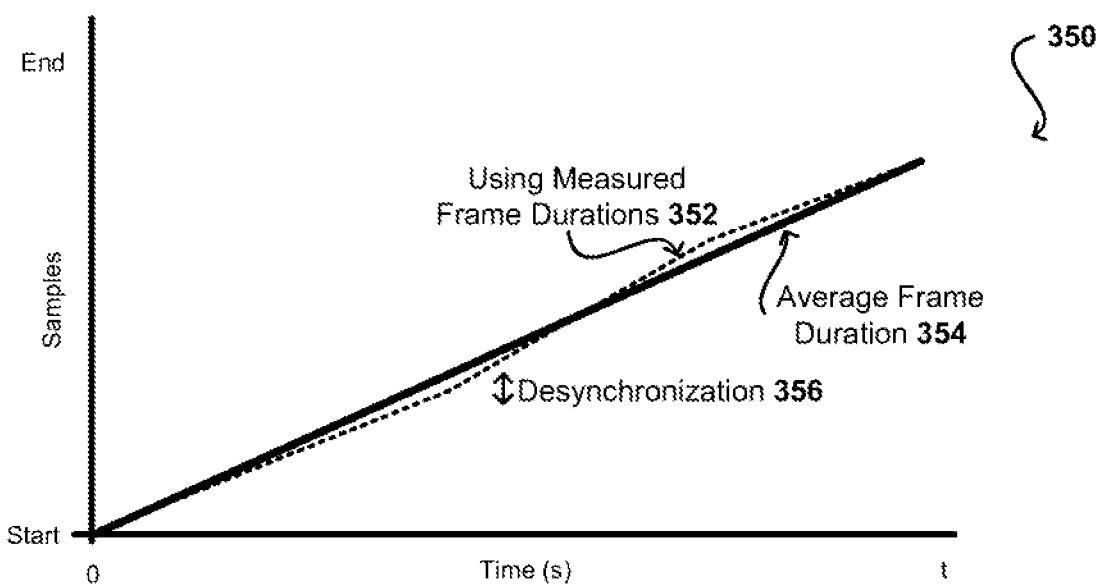

An average frame duration alone may not be sufficient to gauge consistency of a track, stream, or file. Treating the total, accumulated number of samples at any point in a track as a timestamp, however, can make the average frame duration useful, as a system can effectively project a series of timestamps with this average and compare it to a series of timestamps generated directly from the STTS box. Such comparison is illustrated in the plot 350 of FIG. 3B. In this example, it is illustrated that the time series 352 generated from the STTS box, using measured frame durations, may vary both above and below the time series 354 for the average frame duration, resulting in varying amounts of desynchronization 356 over time. At any given point on the x-axis (representing time), the difference between the average line 354 and the measured plot 352 is the amount of desynchronization 356 that will be present if a filter such as atempo is applied. It has been observed that the threshold of perceptible audio/video desync is about 45 ms, as mentioned previously, such that a maximum of around 22 ms can be implemented as a safety gap before approaching this threshold of perceptibility.

In at least one embodiment, the system can convert this result directly into a number of frames using the sample rate of the audio, in order to set boundaries on an average-measured delta. Violating this inequality at any point in the audio track may result in a perceptible audio/visual desynchronization, as may be given by:

$$\Delta(t_{avg}(x), t_{mea}(x)) \le 0.022s$$

where x=time, $t_{avg}$=total samples using average frame duration, $t_{mea}$=total samples as measured in STTS, and s=audio sample rate.

Figure 4A:
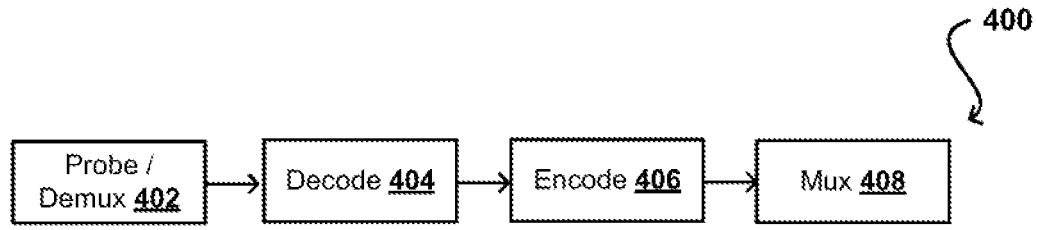
FIGS. 4A and 4B illustrate components of a transcoding system that can be utilized in accordance with various embodiments.

In at least one embodiment, changes can be made to the media engine implementation, such as may include one or more small changes in a schema to add a new setting. An API can be provided that can enable applications to interact with content protection systems to allow playback of encrypted media (e.g., encrypted audio and video). Updates can be performed for the probe/demux 402 and decode phases 404, as illustrated in the phase pipeline 400 of FIG. 4A, which occur prior to the encode 406 and mux 408 phases. In a probe/demux phase 402, a system can perform anomaly detection on the audio input by analyzing the STTS box. In the decode phase 404, the system can pass along this analysis, reconcile the analysis with the correction mode indicated by the customer in the job settings, and then create one or more audio filters to modify the audio data immediately after the audio data is decoded. Once filtered, the audio data can be written to a buffer (or other such location) to be available for audio synchronization.

Figure 4B:
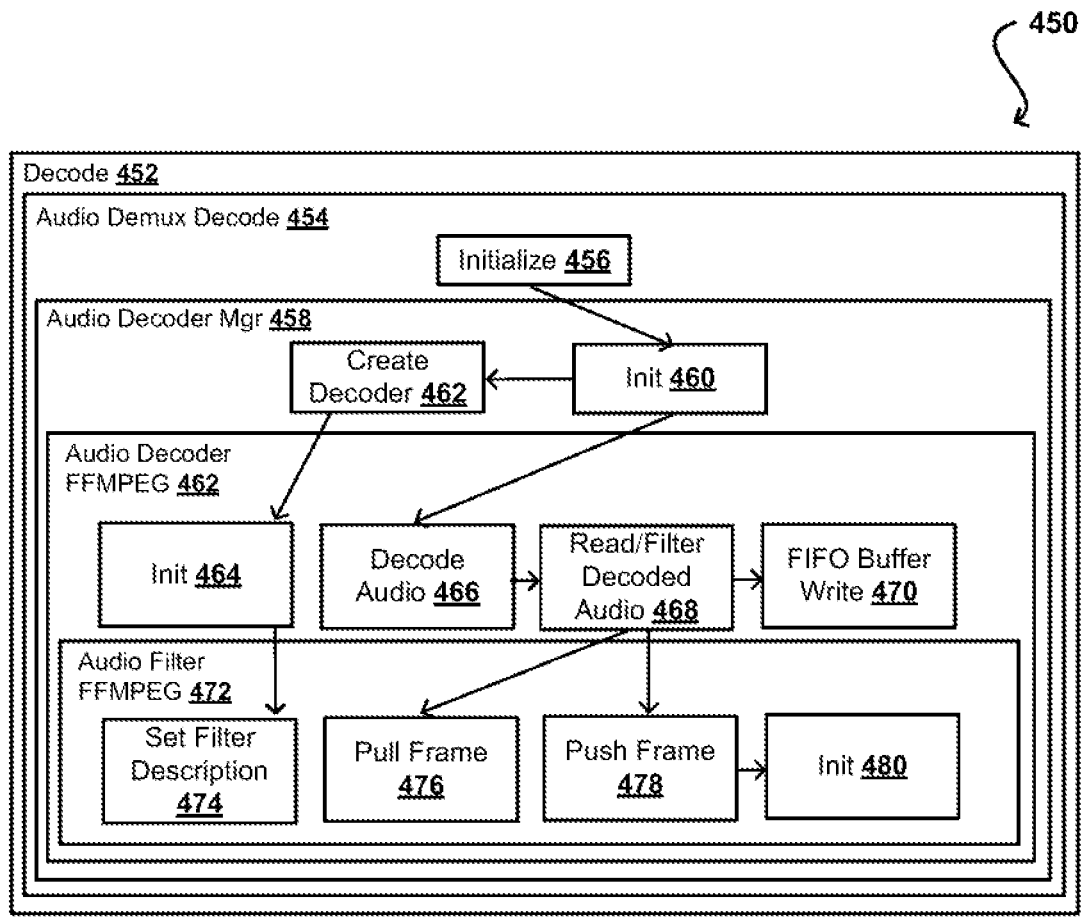

FIG. 4B illustrates components and flow of an example decoding stage 450 (or phase) that can be used in accordance with various embodiments. Deciding which audio filter to use for a given media file can depend, at least in part, upon on what is read from the metadata (e.g., STTS atom) of the input during the probe/demux phase. This can be performed using a reader, such as an MP4 reader. A process can be performed to get the STTS duration data, which can run through the box and detects invalid durations. Such a heuristic can be performed in at least two passes. In a first pass, a system can determine an average frame duration and whether this track is a variable frame rate (VFR) track. If the track is VFR, the system can perform a second pass to determine consistency or "constant VFR." The evaluation of the heuristic, along with the total number of samples, can be saved in the track information.

Once a demux process begins finalizing audio stream data, this sample total can be used to generate a "stretch factor" that represents the relative difference between the average frame duration and the frame duration indicated by the codec (e.g., 1024 or 2048 for AAC, depending on the profile). This stretch factor may be disregarded if the track was not determined to be a "constant VFR" track, unless the job setting explicitly calls for track-level audio duration correction. FFMPEG filters can be used to time-stretch the audio content, namely the are sample and atempo filters for FRAME and TRACK respectively. A filter API can be utilized in at least some embodiments. An FFMPEG audio decoder can be used for inputs, such as MP4 inputs, so there will be substantial parity of objects used, as the system may already read audio/visual frames from the FFMPEG decoder and can feed those directly into the filter API.

A decoder 452 can include a process 456 to initialize the audio demux decode object 454, which can also instruct an initialize process 460 for an audio decoder manager 456 (which can be created by the demux decode object if necessary), which can create the appropriate decoder 462. The decoder 462 can receive metadata structs received from a probe in at least one embodiment, which can be propagated through the decode object 452 which preparing to decode the audio. The created decoder 462 can initialize 464 an audio decoder FFMPEG 462, which can be the lowest level object in this architecture, and cause a filter description to be set 474 using an audio filter FFMPEG 472. Audio that is freshly decoded using a decode audio process 466 of the audio decoder FFMPEG 462 can be read in a read/filter decoded audio function 468 of the decoder FFMPEG 462. Frames can be pulled off with an A/V codec retrieve frame designation, optionally interleaved with planar samples, then written to an audio buffer 470 (e.g., using a FIFO buffer write process) for audio synchronization. The audio decoder FFMPEG in this example can be tasked with checking the state of the pipeline and buffer 470 to determine whether there are frames to be passed along to a next stage of the transcoding process. A filtering pipeline (e.g., a filter graph) can be inserted directly after, but before planar sample interleaving.

In at least one embodiment, all audio entering the decoder will be placed through the filter pipeline. A final audio resampling mode that reaches the FFMPEG audio decoder can determine the description of the filter graph, such as by using a push frame 478 or pull frame process 476 after graph initialization 480. This "description" can take the form of a sub-graph of the entire filter graph, which can be responsible for the actual audio changes. This can be a single filter, a chain of filters, or a complex graph of filters with one input and one output, among other such options. In cases where dynamic audio resampling is not applicable or not necessary, the description can be set to anull, which can pass through the audio data unmodified. For the purposes of dynamic audio resampling in at least one embodiment, options include:

anull (NONE)
   aresample (FRAME)
   atempo (TRACK)

The rest of the filter graph around the main description can serve at least three purposes. This can include, for example, ensuring that the format of audio entering the description matches the format leaving the description. Further, samples can be held in a buffer in case more audio data is needed to perform proper filtering. The frame size of audio data leaving the description may also potentially be regulated, such as in cases where frame sizing is standardized (e.g., AAC).

After placing a frame into the filter graph with a push frame process 478, the decoder can immediately attempt to use a pull frame process 476 to get an audio frame back. It can be expected that the number of frames that are ready to be pulled at this time may be indeterminate as a result of the underlying algorithms used in the resampling filters. A pull frame process 476 can be called in a loop until there are no more frames ready to be pulled out. Art this point, the audio frames can be sent to an audio synchronization process.

Figure 5:
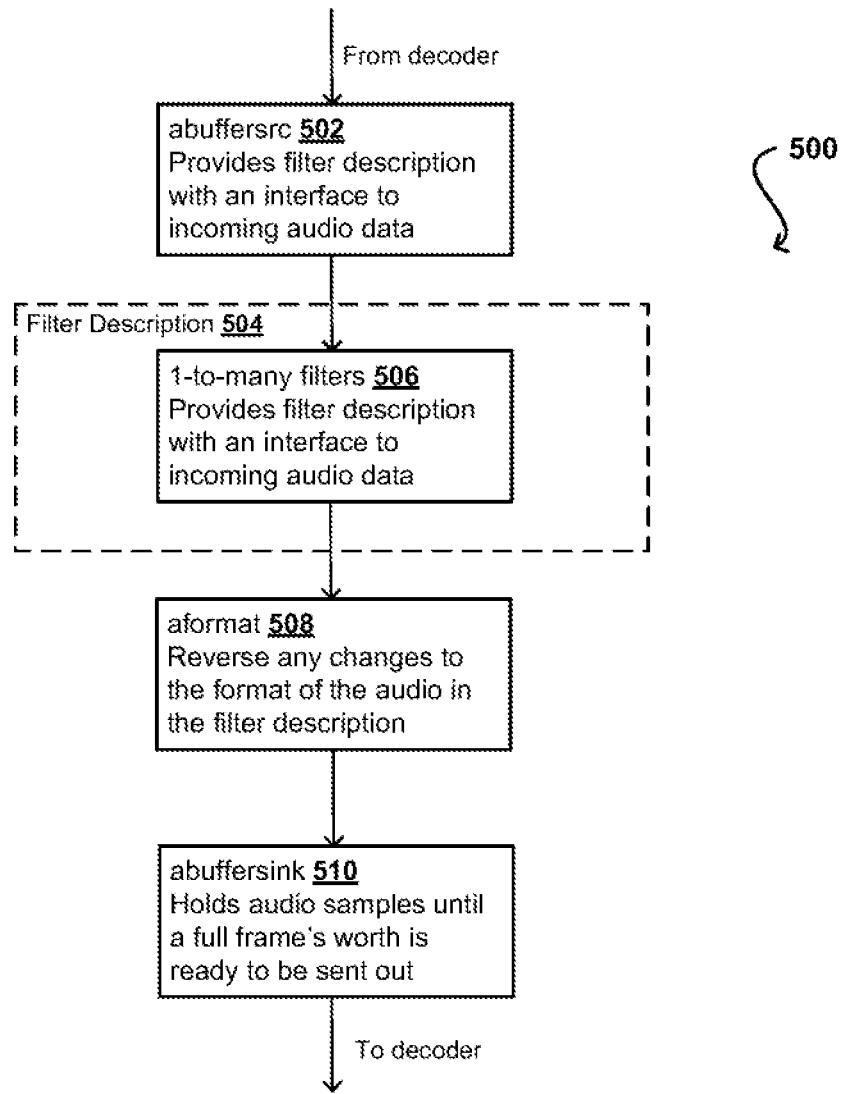
FIG. 5 illustrates an example filtering flow that can be used in a decoder in accordance with various embodiments.

FIG. 5 illustrates an example filter flow 500 that can be utilized in accordance with various embodiments. In this example flow, a buffer sourcing object 502 can provide a filter description 504 with an interface for incoming audio. This audio buffer can store audio frames received from the decoder until time for filtering. A filter determination object 506 can provide the filter description 504 with an interface to the incoming audio. An audio format object 508 can reverse any changes to the format of the audio in the filter description. Finally, the audio samples can be held by an audio buffer 510 until a full frame's worth of data is ready to be sent out to the decoder. The buffer sink can ensure that what is output from the filter is of the same format as what was received into the first audio buffer, and audio can sit in this second buffer until the decoder is ready to reformat the data. In at least some embodiments, the filter description 504 may vary between instances or implementations, with the other sections being more standardized for use to interface with other parts of a decoder. The filter description 504 includes a one-to-many filters 506 object or mapping at least in part because atempo will use its own aresample filter, but there may be one or more underlying filters that are actually performing the operation.

In an example schema, a setting can be added to input correction, as may be given by:

```
AudioSelector:
    type: object
    description: >-
        Use Audio selectors (AudioSelectors) to specify a track
    or set of tracks from the input to be used in the outputs. This
    can include multiple Audio selectors per input.
    properties:
[...]
        audioDurationCorrection:
            $ref: '#/definitions/AudioDurationCorrection'
    DynamicAudioResampling:
        type: string
        description: >-
            Lorem ipsum
        enum:
            NONE
            AUTO
            FRAME
            TRACK
        default: NONE
```

For an example implementation, a default value may be set to be NONE, which may require users to opt in. However, metrics tracking the decision making process of the heuristic may still be present, so that a system can collect some data to determine whether it is safe to use an AUTO setting as the default, which may ultimately provide a better experience in at least some examples. If a default value is set to AUTO, this can make the feature opt-out, should not affect properly-formed audio inputs, may be risky since the feature may apply to a user with "bad" input who did not want or expect a media conversion offering to fix up the audio, and may provide an additional risk that the AUTO setting does not properly select NONE in response to a "good" input. For a NONE setting default, this can make the feature opt-in. Provided the NONE setting is working correctly, there may be no risk to adversely affecting existing customer workflows.

Figure 6:
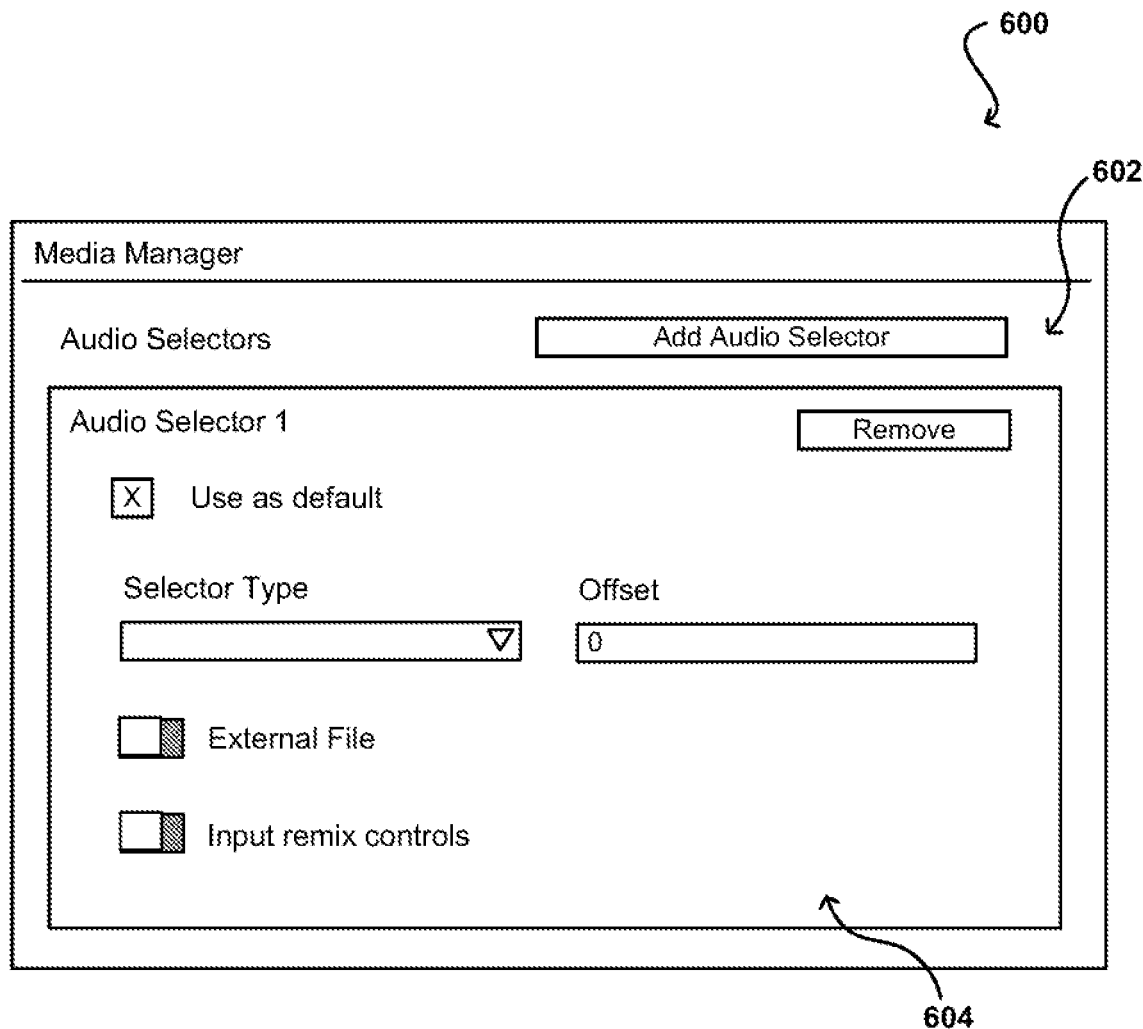
FIG. 6 illustrates an example interface for managing audio selectors that can be utilized in accordance with various embodiments.

In at least one embodiment, a console can place such a setting alongside other Audio Selector settings on an input page. An example audio selector interface 600 is illustrated in FIG. 6. In this example, a user can select one or more options 602 to add or remove an audio selector, as well as to set a given selector as a default. There can be other options 604 for a given audio selector as well, such as to select a type and specify an offset, among other such options. In one embodiment, a combobox can be provided with options such as AUTO, NONE, FRAME, and TRACK options.

Figure 7:
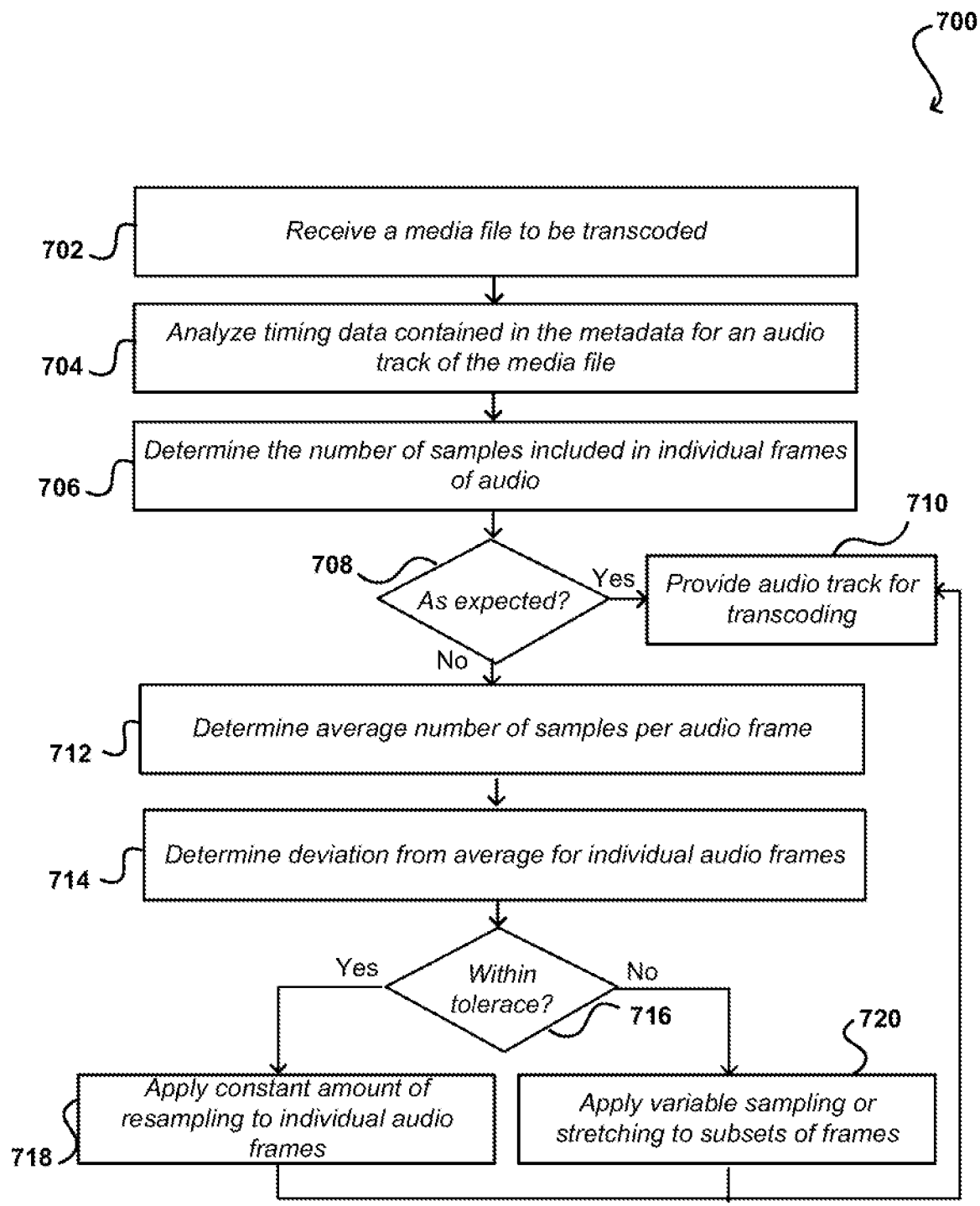
FIG. 7 illustrates an example process for dynamically resampling an audio file in accordance with various embodiments.

FIG. 7 illustrates an example process 700 for resampling audio that can be utilized in accordance with various embodiments. In this example, a media file is received 702 that is to be transcoded (or otherwise processed). This media file can include an audio track, and may contain one or more other tracks or types of content, as may include a video track. As part of a transcoding process, as may be performed using a decoder, timing information contained in metadata for the audio track can be analyzed 704. This can timing information can be used to determine 706 a number of samples included in individual frames of the audio track, where the frames may have a specified or target number of samples, but may contain different numbers of samples for reasons including at least some of those discussed herein.

The number of samples for individual frames can be analyzed to determine whether they correspond to the target number of samples, at least within a permissive amount of deviation. If it is determined that the number of samples for the frames fall within this permissive amount of deviation from the expected value, then the audio track can be provided 710 to downstream components of the transcoding process or system, without any need for audio resampling.

If, however, it is determined that one or more of the audio frames have a number of samples that falls outside this permissive amount of deviation from a target value, then at least some amount of audio resampling can be performed. In this example, a first pass through this timing data can be used to determine 712 an average number of samples per audio frame, as may be based at least in part upon a total number of samples and a total duration of the audio track, or may be determined by averaging the reported number of samples per audio frame, among other such options. A second pass through the data can be performed after an average number of samples per audio frame has been determined, in order to determine 714 a deviation from the average for individual audio frames. This can include determining a deviation such as a mean absolute deviation, among other such options. The deviations for the various frames can be compared against a threshold or tolerance, such as may correspond to a detectability threshold on synchronization, and if it is determined 716 that the amount of deviation is within a specified tolerance, then a constant amount of resampling can be performed for all frames of that audio, which can involve adjusting a number of samples for a given frame without any pitch shifting as discussed herein. This constant amount of resampling can be referred to as a stretch factor that is calculated based at least in part upon the deviation from average in at least one embodiment. If, however, one or more audio frames (or more than a maximum allowable number of audio frames) have deviations that fall outside this tolerance, then another approach can be taken since consistent audio resampling for all frames would still result in some frames being noticeably out of sync. In this example, this other approach can involve applying 720 variable amounts of pitch-invariant resampling for different individual audio frames, or can involve performing pitch-affecting stretching or compressing to individual audio frames, or sequences of audio frames, among other such options. Once the audio has been modified to satisfy deviation constraints, at least where or to an extent possible, then the modified audio track can be provided 710 to the downstream components of the decoder as part of the transcoding process.

Figure 8:
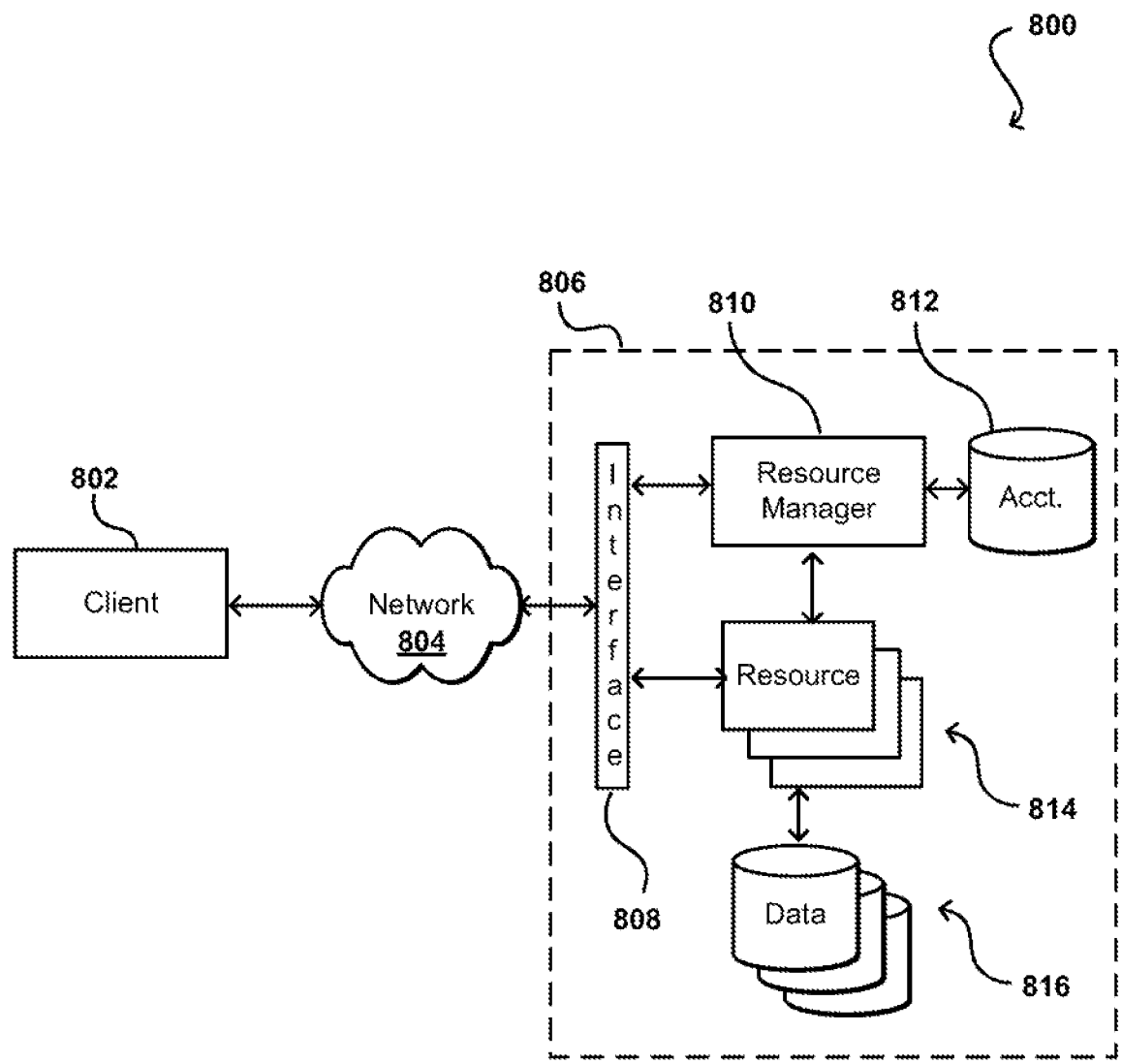
FIG. 8 illustrates an example network-inclusive computing environment in which aspects of various embodiments can be implemented.

FIG. 8 illustrates an example environment 800 in which aspect of various embodiments can be implemented. Such an environment can be used in some embodiments to provide resource capacity for one or more users, or customers of a resource provider, as part of a shared or multi-tenant resource environment. In this example a user is able to utilize a client device 802 to submit requests across at least one network 804 to a multi-tenant resource provider environment 806. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 804 can include any appropriate network, including an intranet, the Internet, a cellular network, a local area network (LAN), or any other such network or combination, and communication over the network can be enabled via wired and/or wireless connections. The resource provider environment 806 can include any appropriate components for receiving requests and returning information or performing actions in response to those requests. As an example, the provider environment might include Web servers and/or application servers for receiving and processing requests, then returning data, Web pages, video, audio, or other such content or information in response to the request. The environment can be secured such that only authorized users have permission to access those resources.

In various embodiments, a provider environment 806 may include various types of resources that can be utilized by multiple users for a variety of different purposes. As used herein, computing and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 814 of one or more types. These types can include, for example, application servers operable to process instructions provided by a user or database servers operable to process data stored in one or more data stores 816 in response to a user request. As known for such purposes, a user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 814 can submit a request that is received to an interface layer 808 of the provider environment 806. The interface layer can include application programming interfaces (APIs) or other exposed interfaces enabling a user to submit requests to the provider environment. The interface layer 808 in this example can also include other components as well, such as at least one Web server, routing components, load balancers, and the like. When a request to provision a resource is received to the interface layer 808, information for the request can be directed to a resource manager 810 or other such system, service, or component configured to manage user accounts and information, resource provisioning and usage, and other such aspects. A resource manager 810 receiving the request can perform tasks such as to authenticate an identity of the user submitting the request, as well as to determine whether that user has an existing account with the resource provider, where the account data may be stored in at least one data store 812 in the provider environment. A user can provide any of various types of credentials in order to authenticate an identity of the user to the provider. These credentials can include, for example, a username and password pair, biometric data, a digital signature, or other such information. The provider can validate this information against information stored for the user. If a user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 802 to communicate with an allocated resource without having to communicate with the resource manager 810, at least until such time as a relevant aspect of the user account changes, the user is no longer granted access to the resource, or another such aspect changes. In some embodiments, a user can run a host operating system on a physical resource, such as a server, which can provide that user with direct access to hardware and software on that server, providing near full access and control over that resource for at least a determined period of time. Access such as this is sometimes referred to as "bare metal" access as a user provisioned on that resource has access to the physical hardware.

A resource manager 810 (or another such system or service) in this example can also function as a virtual layer of hardware and software components that handles control functions in addition to management actions, as may include provisioning, scaling, replication, etc. The resource manager can utilize dedicated APIs in the interface layer 808, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 808 in at least one embodiment includes a scalable set of user-facing servers that can provide the various APIs and return the appropriate responses based on the API specifications. The interface layer also can include at least one API service layer that in one embodiment consists of stateless, replicated servers which process the externally-facing user APIs. The interface layer can be responsible for Web service front end features such as authenticating users based on credentials, authorizing the user, throttling user requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, users of the control service. The servers of the Web services layer can be stateless and scaled horizontally as known in the art. API servers, as well as the persistent data store, can be spread across multiple data centers in a region, for example, such that the servers are resilient to single data center failures.

Figure 9:
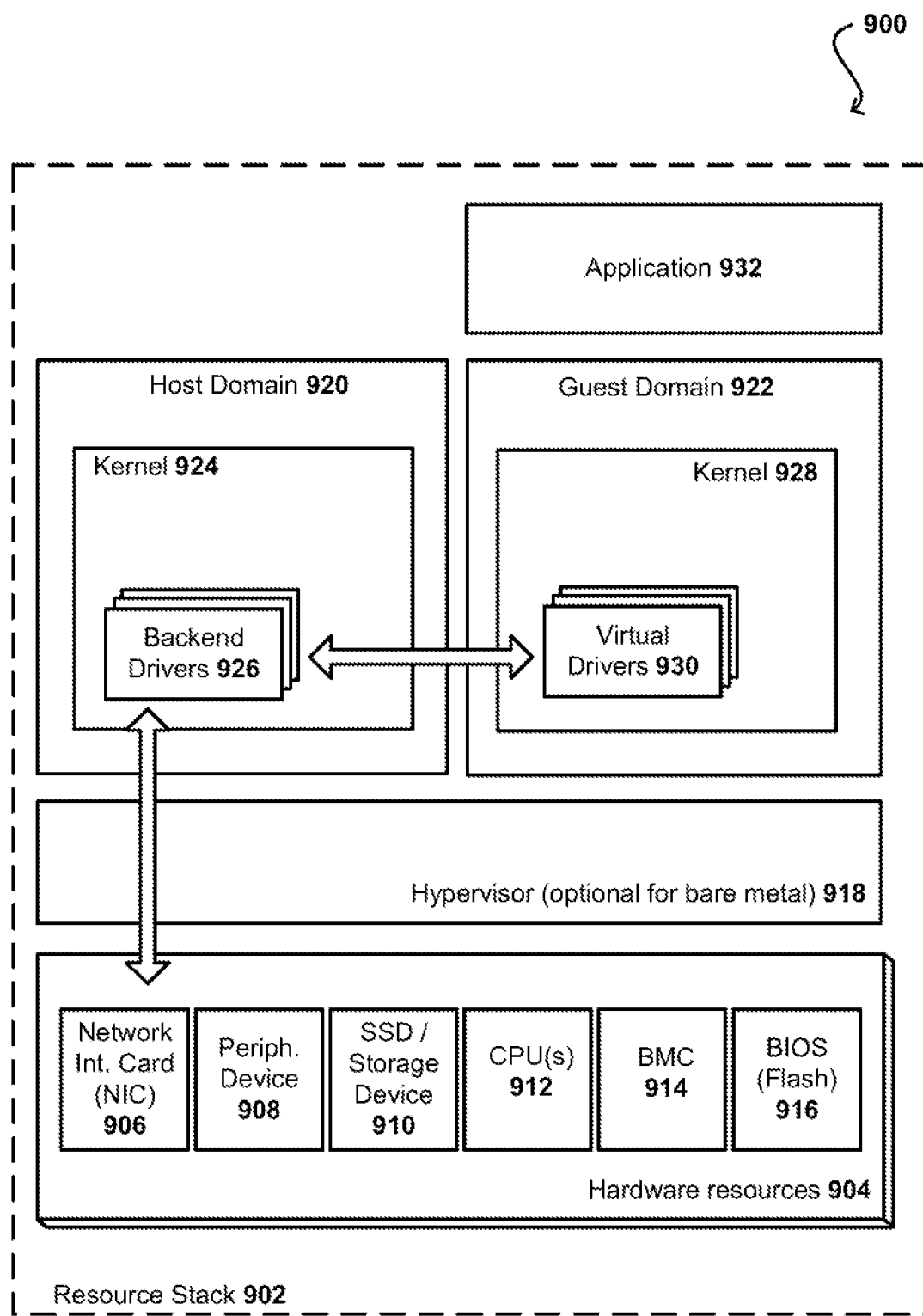
FIG. 9 illustrates example components of a server that can be utilized to perform at least a portion of a transcoding process, in accordance with various embodiments.

FIG. 9 illustrates an example resource stack 902 of a physical resource 900 that can be utilized in accordance with various embodiments. Such a resource stack 902 can be used to provide an allocated environment for a user (or customer of a resource provider) having an operating system provisioned on the resource. In accordance with the illustrated embodiment, the resource stack 902 includes a number of hardware resources 904, such as one or more central processing units (CPUs) 912; solid state drives (SSDs) or other storage devices 910; a network interface card (NIC) 906, one or more peripheral devices (e.g., a graphics processing unit (GPU), etc.) 908, a BIOS implemented in flash memory 916, and a baseboard management controller (BMC) 914, and the like. In some embodiments, the hardware resources 904 reside on a single computing device (e.g. chassis). In other embodiments, the hardware resources can reside on multiple devices, racks, chassis, and the like. Running on top of the hardware resources 904, a virtual resource stack may include a virtualization layer such as a hypervisor 918 for a Xen-based implementation, a host domain 920, and potentially also one or more guest domains 922 capable of executing at least one application 932. The hypervisor 918, if utilized for a virtualized environment, can manage execution of the one or more guest operating systems and allow multiple instances of different operating systems to share the underlying hardware resources 904. Conventionally, hypervisors are installed on server hardware, with the function of running guest operating systems, where the guest operating systems themselves act as servers.

In accordance with an embodiment, a hypervisor 918 can host a number of domains (e.g., virtual machines), such as the host domain 920 and one or more guest domains 922. In one embodiment, the host domain 920 (e.g., the Dom-0) is the first domain created and helps virtualize hardware resources and manage all of the other domains running on the hypervisor 918. For example, the host domain 920 can manage the creating, destroying, migrating, saving, or restoring the one or more guest domains 922 (e.g., the Dom-U). In accordance with various embodiments, the hypervisor 918 can control access to the hardware resources such as the CPU, input/output (I/O) memory, and hypervisor memory.

A guest domain 922 can include one or more virtualized or para-virtualized drivers 930 and the host domain can include one or more backend device drivers 926. When the operating system (OS) kernel 928 in the guest domain 922 wants to invoke an I/O operation, the virtualized driver 930 may perform the operation by way of communicating with the backend device driver 926 in the host domain 920. When the guest driver 930 wants to initiate an I/O operation (e.g., to send out a network packet), a guest kernel component can identify which physical memory buffer contains the packet (or other data) and the guest driver 930 can either copy the memory buffer to a temporary storage location in the kernel for performing I/O or obtain a set of pointers to the memory pages that contain the packet(s). In at least one embodiment, these locations or pointers are provided to the backend driver 926 of the host kernel 924 which can obtain access to the data and communicate it directly to the hardware device, such as the NIC 906 for sending the packet over the network.

It should be noted that the resource stack 902 illustrated in FIG. 9 is only one possible example of a set of resources that is capable of providing a virtualized computing environment and that the various embodiments described herein are not necessarily limited to this particular resource stack. In some embodiments, the guest domain 922 may have substantially native or "bare metal" access to the NIC 906 hardware, for example as provided by device assignment technology based on an IO Memory Management Unit (IO-MMU) device mapping solution like Intel VT-D. In such an implementation, there may be no virtualization layer (e.g., Hypervisor) present. The host domain, or OS, may then be provided by the user, with no guest domains utilized. Other technologies, such Single Root IO Virtualization (SR-IOV), may provide similar "bare metal" functionality to guest domains for only certain functionality of the devices. In general, in various other embodiments, the resource stack may comprise different virtualization strategies, hardware devices, operating systems, kernels, domains, drivers, hypervisors and other resources.

In compute servers, a Board Management Controller (BMC) 914 can maintain a list of events that have occurred in the system, referred to herein as a system event log (SEL). In at least one embodiment, the BMC 914 can receive system event logs from the BIOS 916 on the host processor. The BIOS 916 can provide data for system events over an appropriate interface, such as an I²C interface, to the BMC using an appropriate protocol, such as an SMBus System Interface (SSIF) or KCS interface over LPC. As mentioned, an example of a system event log event from BIOS includes an uncorrectable memory error, indicating a bad RAM stick. In at least some embodiments, system event logs recorded by BMCs on various resources can be used for purposes such as to monitor server health, including triggering manual replacement of parts or instance degrade when SELs from the BIOS indicate failure.

As mentioned, in a virtualized environment the hypervisor 918 can prevent the guest operating system, or guest domain 922, from sending such system event log data to the BMC 914. In the case of bare metal access without such a hypervisor, however, user instances can have the ability to send data for system event that spoof events from the BIOS 916. Such activity could lead to compromised bare metal instances being prematurely degraded due to fake system event data produced by the user OS.

In at least one embodiment, however, there will be portions of the physical resource 900 that will be inaccessible to the user OS. This can include, for example, at least a portion of BIOS memory 916. BIOS memory 916 in at least one embodiment is volatile memory such that any data stored to that memory will be lost in the event of a reboot or power down event. The BIOS may keep at least a portion of host memory unmapped, such that it is not discoverable by a host OS. As mentioned, data such as a secret token can be stored to BIOS memory 916 at boot time, before a user OS is executing on the resource. Once the user OS is executing on the resource, that OS will be prevented from accessing that secret token in BIOS memory 916. In at least one embodiment, this secret token (or other stored secret) can be provided to the BMC 914 when adding system event log events, whereby the BMC 914 can confirm that the event is being sent by the BIOS 916 and not by the user OS.

Figure 10:
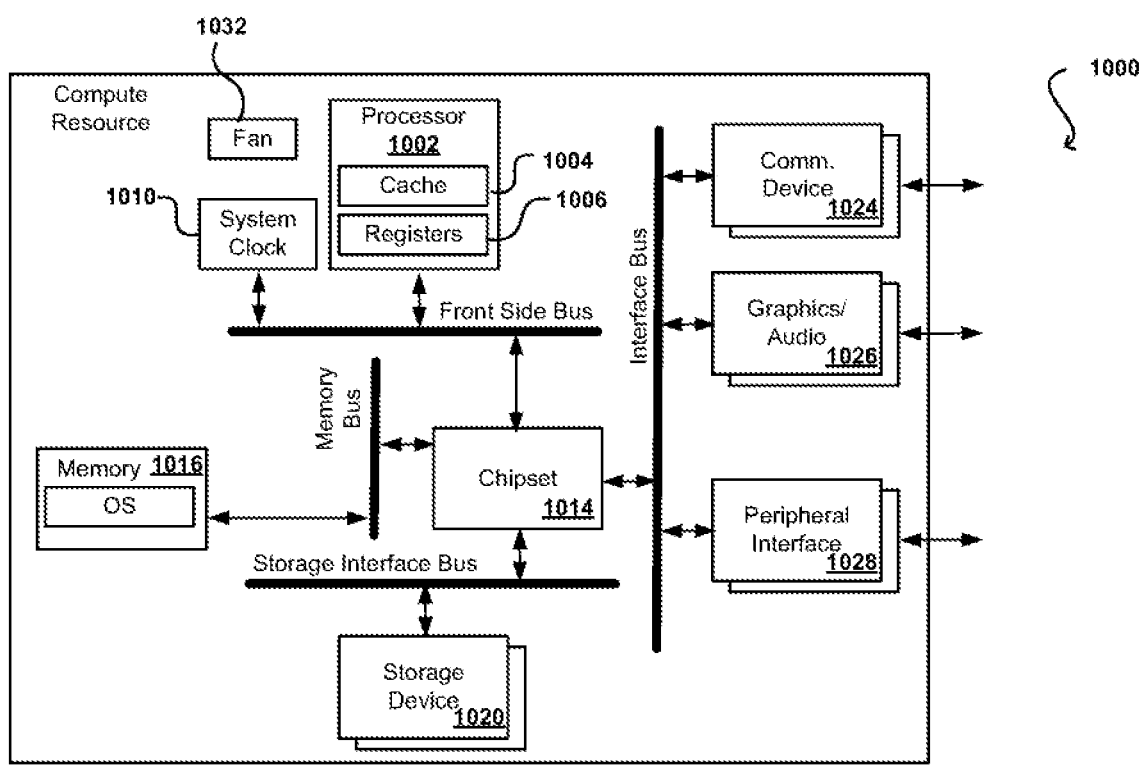
FIG. 10 illustrates example components of a computing device that can be used to implement aspects of various embodiments.

Computing resources, such as servers or personal computers, will generally include at least a set of standard components configured for general purpose operation, although various proprietary components and configurations can be used as well within the scope of the various embodiments. FIG. 10 illustrates components of an example computing resource 1000 that can be utilized in accordance with various embodiments. It should be understood that there can be many such compute resources and many such components provided in various arrangements, such as in a local network or across the Internet or "cloud," to provide compute resource capacity as discussed elsewhere herein. The computing resource 1000 (e.g., a desktop or network server) will have one or more processors 1002, such as central processing units (CPUs), graphics processing units (GPUs), and the like, that are electronically and/or communicatively coupled with various components using various buses, traces, and other such mechanisms. A processor 1002 can include memory registers 1006 and cache memory 1004 for holding instructions, data, and the like. In this example, a chipset 1014, which can include a northbridge and southbridge in some embodiments, can work with the various system buses to connect the processor 1002 to components such as system memory 1016, in the form or physical RAM or ROM, which can include the code for the operating system as well as various other instructions and data utilized for operation of the computing device. The computing device can also contain, or communicate with, one or more storage devices 1020, such as hard drives, flash drives, optical storage, and the like, for persisting data and instructions similar, or in addition to, those stored in the processor and memory. The processor 1002 can also communicate with various other components via the chipset 1014 and an interface bus (or graphics bus, etc.), where those components can include communications devices 1024 such as cellular modems or network cards, media components 1026, such as graphics cards and audio components, and peripheral interfaces 1028 for connecting peripheral devices, such as printers, keyboards, and the like. At least one cooling fan 1032 or other such temperature regulating or reduction component can also be included as well, which can be driven by the processor or triggered by various other sensors or components on, or remote from, the device. Various other or alternative components and configurations can be utilized as well as known in the art for computing devices.

At least one processor 1002 can obtain data from physical memory 1016, such as a dynamic random access memory (DRAM) module, via a coherency fabric in some embodiments. It should be understood that various architectures can be utilized for such a computing device, that may include varying selections, numbers, and arguments of buses and bridges within the scope of the various embodiments. The data in memory may be managed and accessed by a memory controller, such as a DDR controller, through the coherency fabric. The data may be temporarily stored in a processor cache 1004 in at least some embodiments. The computing device 1000 can also support multiple I/O devices using a set of I/O controllers connected via an I/O bus. There may be I/O controllers to support respective types of I/O devices, such as a universal serial bus (USB) device, data storage (e.g., flash or disk storage), a network card, a peripheral component interconnect express (PCIe) card or interface 1028, a communication device 1024, a graphics or audio card 1026, and a direct memory access (DMA) card, among other such options. In some embodiments, components such as the processor, controllers, and caches can be configured on a single card, board, or chip (i.e., a system-on-chip implementation), while in other embodiments at least some of the components may be located in different locations, etc.

An operating system (OS) running on the processor 1002 can help to manage the various devices that may be utilized to provide input to be processed. This can include, for example, utilizing relevant device drivers to enable interaction with various I/O devices, where those devices may relate to data storage, device communications, user interfaces, and the like. The various I/O devices will typically connect via various device ports and communicate with the processor and other device components over one or more buses. There can be specific types of buses that provide for communications according to specific protocols, as may include peripheral component interconnect) PCI or small computer system interface (SCSI) communications, among other such options. Communications can occur using registers associated with the respective ports, including registers such as data-in and data-out registers. Communications can also occur using memory-mapped I/O, where a portion of the address space of a processor is mapped to a specific device, and data is written directly to, and from, that portion of the address space.

Such a device may be used, for example, as a server in a server farm or data warehouse. Server computers often have a need to perform tasks outside the environment of the CPU and main memory (i.e., RAM). For example, the server may need to communicate with external entities (e.g., other servers) or process data using an external processor (e.g., a General Purpose Graphical Processing Unit (GPGPU). In such cases, the CPU may interface with one or more I/O devices. In some cases, these I/O devices may be special-purpose hardware designed to perform a specific role. For example, an Ethernet network interface controller (NIC) may be implemented as an application specific integrated circuit (ASIC) comprising digital logic operable to send and receive packets.

In an illustrative embodiment, a host computing device is associated with various hardware components, software components and respective configurations that facilitate the execution of I/O requests. One such component is an I/O adapter that inputs and/or outputs data along a communication channel In one aspect, the I/O adapter device can communicate as a standard bridge component for facilitating access between various physical and emulated components and a communication channel. In another aspect, the I/O adapter device can include embedded microprocessors to allow the I/O adapter device to execute computer executable instructions related to the implementation of management functions or the management of one or more such management functions, or to execute other computer executable instructions related to the implementation of the I/O adapter device. In some embodiments, the I/O adapter device may be implemented using multiple discrete hardware elements, such as multiple cards or other devices. A management controller can be configured in such a way to be electrically isolated from any other component in the host device other than the I/O adapter device. In some embodiments, the I/O adapter device is attached externally to the host device. In some embodiments, the I/O adapter device is internally integrated into the host device. Also in communication with the I/O adapter device may be an external communication port component for establishing communication channels between the host device and one or more network-based services or other network-attached or direct-attached computing devices Illustratively, the external communication port component can correspond to a network switch, sometimes known as a Top of Rack ("TOR") switch. The I/O adapter device can utilize the external communication port component to maintain communication channels between one or more services and the host device, such as health check services, financial services, and the like.

The I/O adapter device can also be in communication with a Basic Input/Output System (BIOS) component. The BIOS component can include non-transitory executable code, often referred to as firmware, which can be executed by one or more processors and used to cause components of the host device to initialize and identify system devices such as the video display card, keyboard and mouse, hard disk drive, optical disc drive and other hardware. The BIOS component can also include or locate boot loader software that will be utilized to boot the host device. For example, in one embodiment, the BIOS component can include executable code that, when executed by a processor, causes the host device to attempt to locate Preboot Execution Environment (PXE) boot software. Additionally, the BIOS component can include or takes the benefit of a hardware latch that is electrically controlled by the I/O adapter device. The hardware latch can restrict access to one or more aspects of the BIOS component, such controlling modifications or configurations of the executable code maintained in the BIOS component. The BIOS component can be connected to (or in communication with) a number of additional computing device resources components, such as processors, memory, and the like. In one embodiment, such computing device resource components may be physical computing device resources in communication with other components via the communication channel. The communication channel can correspond to one or more communication buses, such as a shared bus (e.g., a front side bus, a memory bus), a point-to-point bus such as a PCI or PCI Express bus, etc., in which the components of the bare metal host device communicate. Other types of communication channels, communication media, communication buses or communication protocols (e.g., the Ethernet communication protocol) may also be utilized. Additionally, in other embodiments, one or more of the computing device resource components may be virtualized hardware components emulated by the host device. In such embodiments, the I/O adapter device can implement a management process in which a host device is configured with physical or emulated hardware components based on a variety of criteria. The computing device resource components may be in communication with the IO adapter device via the communication channel. In addition, a communication channel may connect a PCI Express device to a CPU via a northbridge or host bridge, among other such options.

In communication with the I/O adapter device via the communication channel may be one or more controller components for managing hard drives or other forms of memory. An example of a controller component can be a SATA hard drive controller Similar to the BIOS component, the controller components can include or take the benefit of a hardware latch that is electrically controlled by the I/O adapter device. The hardware latch can restrict access to one or more aspects of the controller component. Illustratively, the hardware latches may be controlled together or independently. For example, the I/O adapter device may selectively close a hardware latch for one or more components based on a trust level associated with a particular user. In another example, the I/O adapter device may selectively close a hardware latch for one or more components based on a trust level associated with an author or distributor of the executable code to be executed by the I/O adapter device In a further example, the I/O adapter device may selectively close a hardware latch for one or more components based on a trust level associated with the component itself. The host device can also include additional components that are in communication with one or more of the illustrative components associated with the host device. Such components can include devices, such as one or more controllers in combination with one or more peripheral devices, such as hard disks or other storage devices. Additionally, the additional components of the host device can include another set of peripheral devices, such as Graphics Processing Units ("GPUs"). The peripheral devices and can also be associated with hardware latches for restricting access to one or more aspects of the component. As mentioned above, in one embodiment, the hardware latches may be controlled together or independently.

As discussed, different approaches can be implemented in various environments in accordance with the described embodiments. As will be appreciated, although a network- or Web-based environment is used for purposes of explanation in several examples presented herein, different environments may be used, as appropriate, to implement various embodiments. Such a system can include at least one electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C # or C++ or any scripting language, such as Perl, Python or TCL, as well as combinations thereof. The server(s) may also include database servers, including without limitation those commercially available from Oracle*, Microsoft*, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   receiving a media file to be transcoded, the media file including at least an audio portion and a video portion;
   determining, based at least in part upon metadata associated with the media file, that a total duration of the audio portion is different from an expected duration;
   determining, based at least in part upon the metadata, an average frame duration across a plurality of audio frames of the audio portion;
   determining, for the plurality of audio frames, that individual frame durations for the plurality of audio frames fall within a permissible threshold of the average frame duration;
   applying a resampling filter to the plurality of frames in order to apply a constant amount of duration adjustment across the plurality of audio frames, wherein the total duration of the resampled audio portion equals the expected duration; and
   performing transcoding of the media file including the video portion and the resampled audio portion.

2. The computer-implemented method of claim 1, further comprising:
   determining timing information for the plurality of audio frames using a time-to-sample (STTS) atom.

3. The computer-implemented method of claim 1, wherein the resampling filter is an FFMPEG filter.

4. The computer-implemented method of claim 1, wherein the constant amount of duration adjustment is a stretch factor corresponding to a difference between the average frame duration and a target frame duration for the plurality of audio frames.

5. The computer-implemented method of claim 1, wherein the resampling filter applies the constant amount of duration adjustment without affecting a pitch of the audio data in the individual audio frames.

6. A method, comprising:
   determining one or more variations in duration of a plurality of audio frames in an audio track; and
   performing, using an audio filter, resampling for one or more of the audio frames to cause the one or more audio frames to have a target audio frame duration, wherein the resampling is performed without deleting one or more frames of input audio, adding one or more frames of silent audio, or adjusting a pitch of the audio frames.

7. The method of claim 6, wherein the audio track is received in a media file further containing a video portion and metadata, and wherein the media file is to be transcoded for presentation on at least one media player.

8. The method of claim 7, wherein the resampling is performed to cause a total duration of the audio track to correspond to an expected duration of the audio track.

9. The method of claim 7, further comprising:
analyzing, in a first pass, timing data included in the metadata of the media file to determine an average duration of the plurality of audio frames; and
analyzing, in a second pass, the timing data to determine the variations in duration with respect to the average duration.

10. The method of claim 9, further comprising:
determining that the variations in duration fall within a permissive threshold of the average duration before performing the resampling, wherein the resampling performs a constant adjustment in the duration of the plurality of audio frames.

11. The method of claim 9, further comprising:
determining that one or more of the variations in duration fall outside a permissive threshold of the average duration; and
performing the resampling using different amounts of adjustment for different sequences of the audio frames in the audio track.

12. The method of claim 9, wherein the different amounts of adjustment include at least one type of adjustment that modifies a pitch or changes a number of audio frames in the different sequences.

13. The method of claim 6, further comprising:
determining timing information for the plurality of audio frames using a time-to-sample (STTS) atom.

14. The method of claim 6, wherein the audio filter is an FFMPEG filter.

15. The method of claim 6, further comprising:
performing the resampling in a decoder of a transcoding process.

16. A system, comprising:
a processor; and
memory including instructions that, when executed by the processor, cause the system to:
receive a media file to be transcoded;
determine one or more variations in duration of a plurality of audio frames in an audio track of the media file; and
perform, using an audio filter, resampling for one or more of the audio frames to cause the one or more audio frames to have a target audio frame duration, wherein the resampling is performed without deleting one or more frames of input audio, adding one or more frames of silent audio, or adjusting a pitch of the audio frames.

17. The system of claim 16, wherein the media file further contains a video portion and metadata, and wherein the resampling is performed to cause a total duration of the audio track to correspond to an expected duration.

18. The system of claim 17, wherein the instructions when executed further cause the system to:
analyze, in a first pass, timing data included in the metadata of the media file to determine an average duration of the plurality of audio frames; and
analyze, in a second pass, the timing data to determine the variations in duration with respect to the average duration.

19. The system of claim 18, wherein the instructions when executed further cause the system to:
determine that the variations in duration fall within a permissive threshold of the average duration before performing the resampling, wherein the resampling performs a constant adjustment in the duration of the plurality of audio frames.

20. The system of claim 16, wherein the audio filter is an FFMPEG filter, and wherein the instructions when executed further cause the system to:
determine timing information for the plurality of audio frames using a time-to-sample (STTS) atom.

* * * * *